(12) United States Patent
Nakamura et al.

(10) Patent No.: US 10,134,309 B2
(45) Date of Patent: Nov. 20, 2018

(54) DECORATIVE DEVICE

(71) Applicant: FUJIFILM Corporation, Tokyo (JP)

(72) Inventors: Samito Nakamura, Tokyo (JP);
Hiromi Takenoshita, Tokyo (JP);
Daisaku Abiru, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/790,143

(22) Filed: Oct. 23, 2017

(65) Prior Publication Data

US 2018/0047318 A1    Feb. 15, 2018

Related U.S. Application Data

(63) Continuation of application No. PCT/JP2016/061989, filed on Apr. 14, 2016.

(30) Foreign Application Priority Data

Apr. 30, 2015 (JP) .................................. 2015-092622

(51) Int. Cl.
*H04M 1/02* (2006.01)
*H04B 1/3888* (2015.01)
(Continued)

(52) U.S. Cl.
CPC .......... *G09F 13/0413* (2013.01); *A45C 11/00* (2013.01); *G02B 27/22* (2013.01);
(Continued)

(58) Field of Classification Search
CPC .... H04M 1/15; H04M 1/0249; H04M 1/0283; H04B 1/3888; H04B 1/03; H04R 1/1033;
(Continued)

(56) References Cited

U.S. PATENT DOCUMENTS

2007/0297050 A1* 12/2007 Seki ..................... G03B 21/625
359/446
2009/0147365 A1* 6/2009 Inokuma ............... C03C 17/007
359/599
(Continued)

FOREIGN PATENT DOCUMENTS

EP          2560351 A2    2/2013
JP        2005-103877 A    4/2005
(Continued)

OTHER PUBLICATIONS

International Search Report issued in PCT/JP2016/061989; dated Jun. 28, 2016.
(Continued)

*Primary Examiner* — Andrew Wendell
(74) *Attorney, Agent, or Firm* — Studebaker & Brackett PC (57) ABSTRACT

A decorative cover includes a lenticular lens sheet, an outer frame, a connection point, and a plurality of LED chips. The outer frame is fitted onto an outer periphery of a smartphone. The lenticular lens sheet is integrated with the outer frame and covers a rear surface of the smartphone. The plurality of LED chips is arranged parallel to a longitudinal direction of cylindrical lenses on a flat surface side of the lenticular lens sheet. A drive unit changes a light emission state of each of the plurality of LED chips. The drive unit is connected with a control unit of the smartphone through a connection point and the connection point. The drive unit changes the light emission state of each LED chip in accordance with an operating state of the smartphone operated by the control unit.

4 Claims, 12 Drawing Sheets

(51) Int. Cl.
*H04B 1/03* (2006.01)
*G09F 13/04* (2006.01)
*A45C 11/00* (2006.01)
*G02B 27/22* (2018.01)
*G09F 13/20* (2006.01)
*H04M 1/11* (2006.01)
*G09F 19/12* (2006.01)
*G09F 13/22* (2006.01)
*G09F 23/00* (2006.01)

(52) U.S. Cl.
CPC .............. *G09F 13/04* (2013.01); *G09F 13/20* (2013.01); *G09F 19/12* (2013.01); *H04M 1/11* (2013.01); *A45C 2011/002* (2013.01); *G09F 23/00* (2013.01); *G09F 2013/222* (2013.01)

(58) Field of Classification Search
CPC .. H04R 2499/11; G09F 13/0413; G09F 13/00
See application file for complete search history.

(56) References Cited

U.S. PATENT DOCUMENTS

| | | | | |
|---|---|---|---|---|
| 2011/0128482 | A1* | 6/2011 | Ishiguro | G02B 5/3083 349/106 |
| 2011/0188009 | A1* | 8/2011 | Matsui | G03B 21/28 353/98 |
| 2012/0257018 | A1* | 10/2012 | Shigemura | G02B 27/2214 348/46 |
| 2013/0027909 | A1* | 1/2013 | Kim | G02F 1/133603 362/97.2 |
| 2013/0286684 | A1* | 10/2013 | Holman | F21V 17/16 362/612 |
| 2013/0300958 | A1* | 11/2013 | Matsuhiro | G02B 27/26 349/15 |
| 2014/0049829 | A1* | 2/2014 | Yumoto | G02B 27/2214 359/619 |
| 2014/0073378 | A1 | 3/2014 | Coverstone et al. | |

FOREIGN PATENT DOCUMENTS

| | | |
|---|---|---|
| JP | 2007-206659 A | 8/2007 |
| JP | 2012-125466 A | 7/2012 |
| JP | 3177624 U | 8/2012 |
| JP | 3179842 U | 11/2012 |
| JP | 2014-207245 A | 10/2014 |
| WO | 2014/168496 A1 | 10/2014 |

OTHER PUBLICATIONS

International Preliminary Report on Patentability issued in PCT/JP2016/061989; dated Aug. 23, 2017.

Extended European Search Report issued by the European Patent Office dated May 2, 2018, which corresponds to EP16786314.1-1201 and is related to U.S. Appl. No. 15/790,143.

An Office Action mailed by the Japanese Patent Office dated Aug. 29, 2018, which corresponds to Japanese Patent No. 2017-515474 and is related to U.S. Appl. No. 15/790,143.

* cited by examiner

DECORATIVE DEVICE

CROSS-REFERENCE TO RELATED APPLICATIONS

This application is a Continuation of PCT International Application No. PCT/JP2016/061989 filed on Apr. 14, 2016, which claims priority under 35 U.S.C. § 119(a) to Japanese Patent Application No. 2015-092622 filed on Apr. 30, 2015. The above application is hereby expressly incorporated by reference, in its entirety, into the present application.

BACKGROUND OF THE INVENTION

1. Field of the Invention

The present invention relates to a decorative device that decorates the exterior of a smartphone or the like.

2. Description of the Related Art

A decorative cover for decorating the exterior of a smartphone, a tablet computer, or the like is known. For example, a decorative cover disclosed in JP2012-125466A has an engaging unit that engages with the outer periphery of a smartphone, a cover unit that is integrated with the engaging unit, and a decorative component that is disposed on the front surface of the cover unit and has a shape of a pattern, a character, or the like. The decorative cover is detachably attached to the smartphone. The cover unit is formed by stacking sheet materials having different colors. The cover unit is decorated by forming a cutout on the sheet material on the upper surface side to expose the sheet material on the lower surface side.

The decorative cover disclosed in JP2012-125466A has the decorative component, the cutout formed on the cover portion, and the like as elements decorating a smartphone. The elements may cause a finger or the like to be caught and may hinder manipulation of the smartphone. In recent years, a small light source such as a light emitting diode (LED) has been widely used as a decorative element. However, a light source such as an LED has a narrow range of light emission. Thus, multiple light sources are required in order to achieve highly decorative illumination light.

The applicant of the present invention conceives a decorative device that achieves highly decorative illumination light safely and with a small number of light sources without hindering manipulation, thereby improving decorative quality.

SUMMARY OF THE INVENTION

An object of the present invention is to provide a decorative device that improves decorative quality safely and with highly decorative illumination light.

A decorative device of the present invention is a decorative device that decorates an operating device. The decorative device includes a lenticular lens sheet, a light source, and a drive unit. A cylindrical lens having a convex shape is arranged in plural number in the lenticular lens sheet with a flat surface formed on an opposite side from the convex shape. The light source is disposed on the flat surface side. The drive unit changes a light emission state of the light source in accordance with an operating state of the operating device or information included in the operating device.

It is preferable that the light source be provided in plural number and that the plurality of light sources be arranged parallel to a longitudinal direction of each cylindrical lens. It is preferable that the lenticular lens sheet be provided in plural number and that the plurality of lenticular lens sheets be stacked.

It is preferable that one lenticular lens sheet be inclined with respect to another lenticular lens sheet. It is preferable that one lenticular lens sheet be slidably disposed with respect to another lenticular lens sheet.

It is preferable that the drive unit change a light emission pattern of the light source in accordance with the operating state of the operating device or the information included in the operating device. It is preferable that an image formation layer on which a pattern is formed be disposed on the flat surface side of one lenticular lens sheet.

According to the present invention, a light source is disposed on a flat surface side of a lenticular lens sheet in which a cylindrical lens is arranged in plural number, and a light emission state is changed in accordance with an operating state of an operating device or information included in the operating device. Thus, decorative quality can be improved safely and with highly decorative illumination light without hindering manipulation.

DESCRIPTION OF THE PREFERRED EMBODIMENTS

First Embodiment

Figure 1:
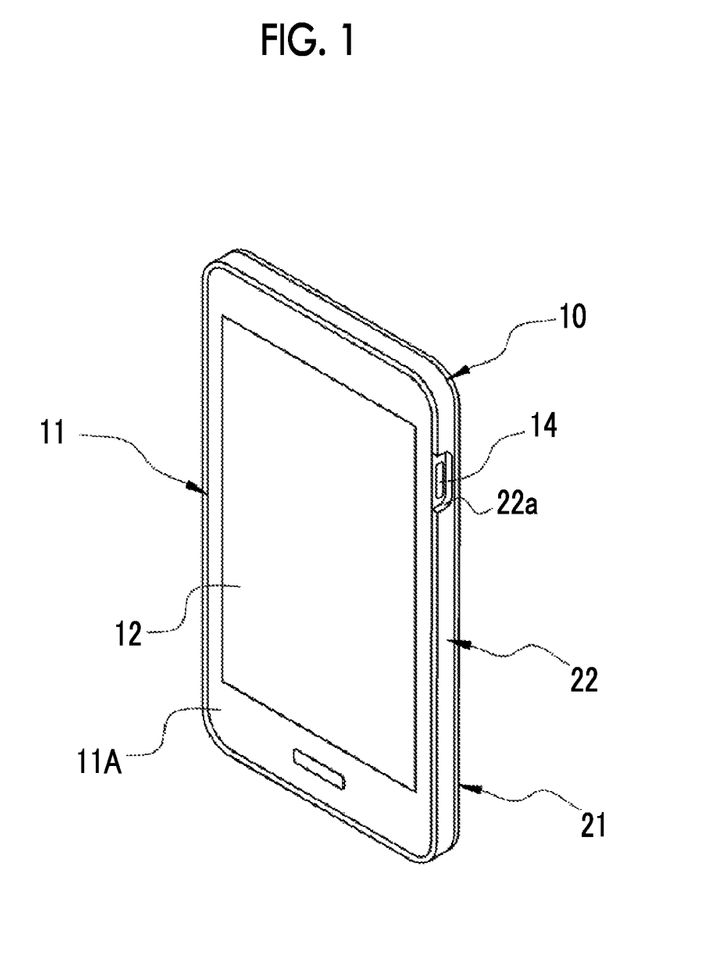
FIG. 1 is a front perspective view of a smartphone equipped with a decorative cover as a decorative device of the present invention.
Figure 2:
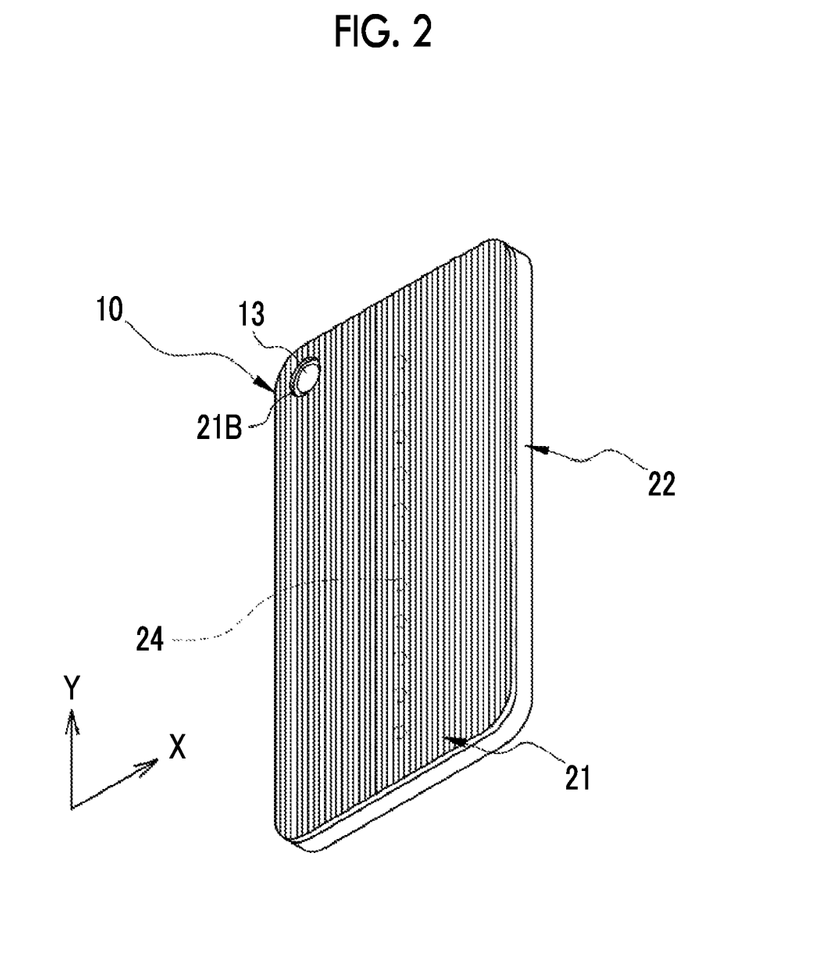
FIG. 2 is a rear perspective view of the smartphone equipped with the decorative cover.
Figure 3:
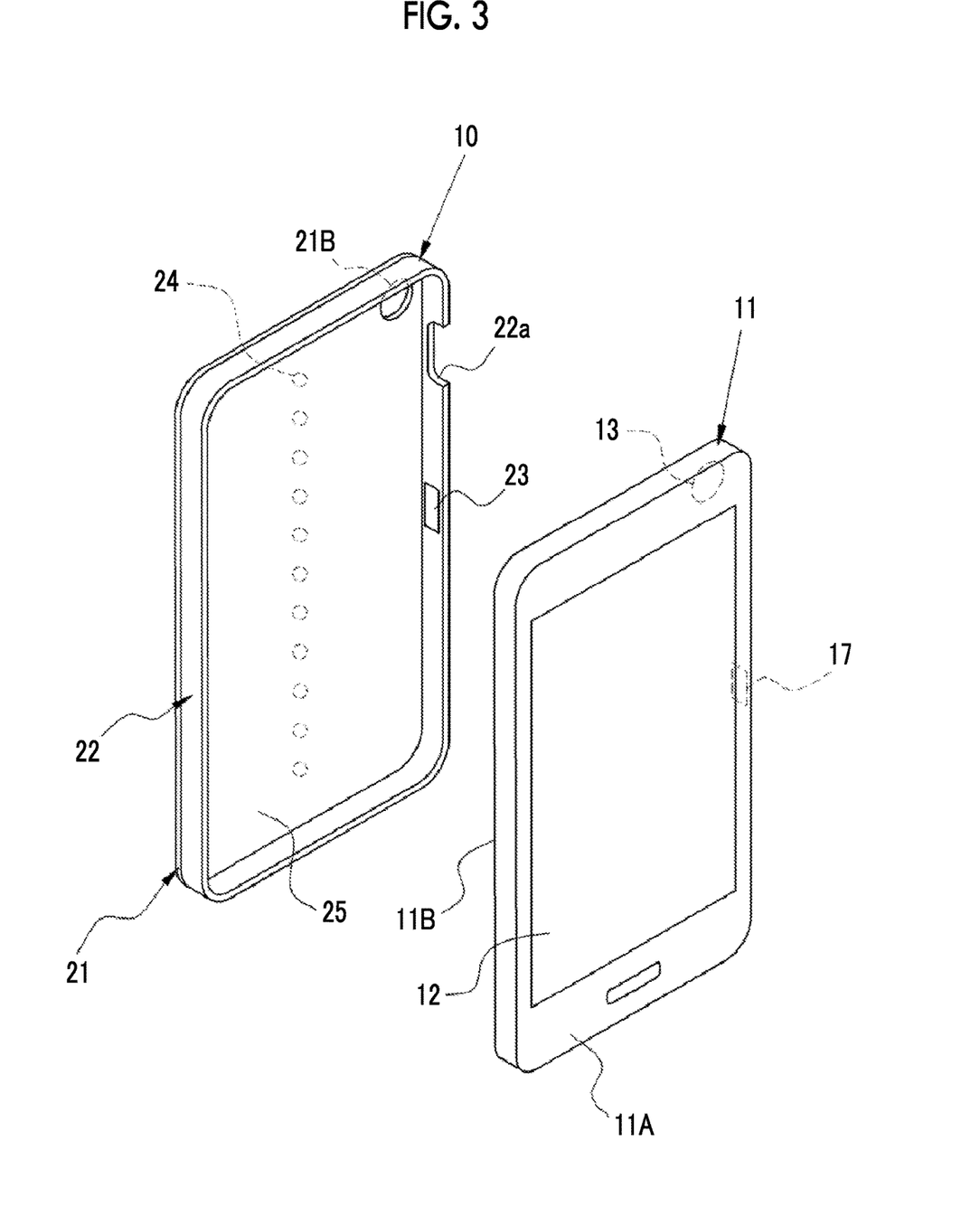
FIG. 3 is a perspective view of the decorative cover and the smartphone.

A decorative cover 10 is illustrated in FIG. 1 to FIG. 3 as one example of a decorative device of the present invention. As illustrated in FIG. 1, the decorative cover 10 is attached to a smartphone 11 as an operating device to decorate the exterior of the smartphone 11. The smartphone 11 has a display and input unit 12 on a front surface 11A. The display and input unit 12 is manipulated with a finger or the like to provide a predetermined instruction to a control unit 15 (refer to FIG. 4) in the smartphone 11. A known touch panel display is used as the display and input unit 12.

As illustrated in FIG. 2 and FIG. 3, a camera module 13 is disposed on a rear surface 11B side of the smartphone 11 where the decorative cover 10 is attached. The camera module 13 is used to image a still picture or a motion picture. The still picture or the motion picture imaged by the camera module 13 is displayed on the display and input unit 12. A power source switch 14 or the like is disposed in the smartphone 11.

Figure 4:
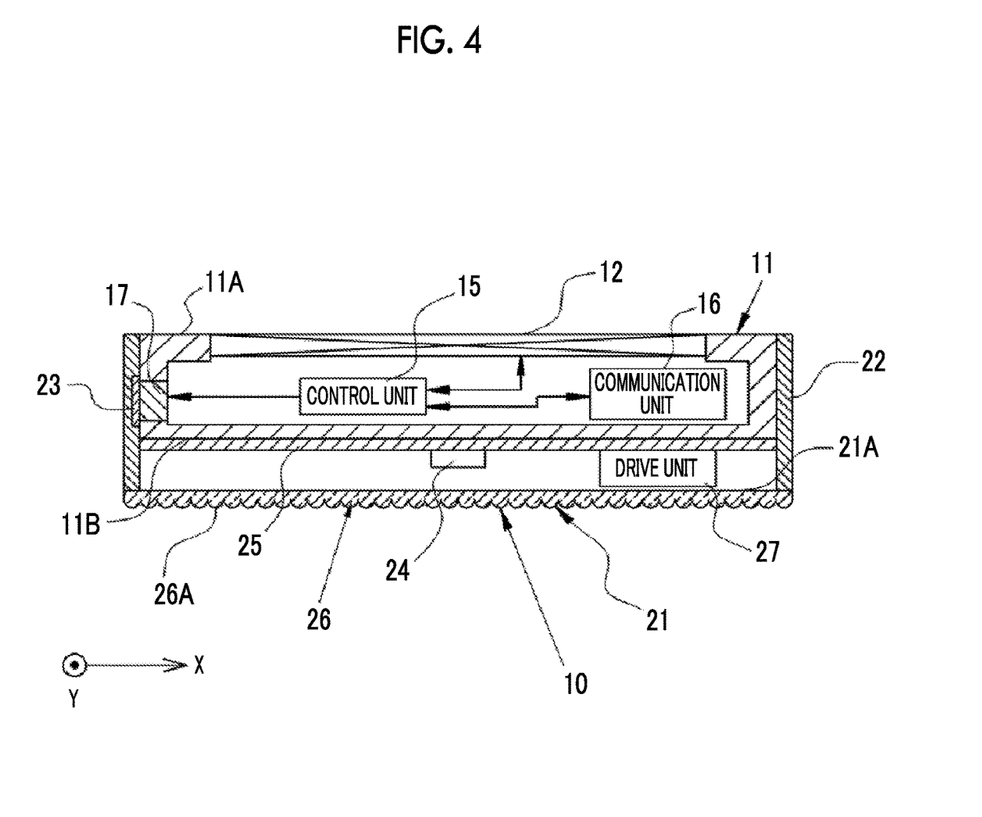
FIG. 4 is a sectional view of a main portion including the decorative cover and the smartphone.

As illustrated in FIG. 4, the smartphone 11 includes the control unit 15, a communication unit 16, a connection point 17, and the like. The control unit 15 controls each unit of the smartphone 11 and executes various processes corresponding to an input instruction in response to manipulation of the display and input unit 12 or the like. The communication unit 16 communicates with a base station of a telephone company.

The control unit 15 communicates with the base station through the communication unit 16 in accordance with an input on the display and input unit 12 or the like. A call can be made to another telephone through a microphone and a speaker (not illustrated) that are incorporated in the smartphone 11. The control unit 15 displays a web page on the display and input unit 12 or sends and receives mails by connecting to the Internet through the communication unit 16. The connection point 17 electrically connects the control unit 15 with the decorative cover 10 by being brought into contact with a connection point 23 of the decorative cover 10 described below.

As illustrated in FIG. 3, the decorative cover 10 includes a lenticular lens sheet 21, an outer frame 22, the connection point 23, a plurality of LED chips 24, and a substrate 25. The outer frame 22 is an oblong frame that is fitted onto the outer periphery of the smartphone 11. A cutout 22a that exposes the power source switch 14 is formed on the outer frame 22.

The lenticular lens sheet 21 is integrated with the outer frame 22. The lenticular lens sheet 21 covers the rear surface 11B of the smartphone 11 in a case where the outer frame 22 is fitted onto the outer periphery of the smartphone 11.

The lenticular lens sheet 21 is configured with a plurality of cylindrical lenses 26. Each cylindrical lens 26 has a half-cylindrical convex shape 26A. The opposite side of each cylindrical lens 26 from the convex shape 26A is flat. Each cylindrical lens 26 stretches in a Y direction and is disposed parallel to the adjacent cylindrical lenses 26. That is, the cylindrical lenses 26 are disposed at constant pitches in an X direction that is orthogonal with respect to the Y direction. The lenticular lens sheet 21 has a flat surface 21A on the opposite side thereof from the convex shape 26A.

A transparent resin material such as polyethylene terephthalate (PET), polypropylene (PP), polyethylene terephthalate glycol-modified (PETG), polycarbonate, acryl, or acrylate-based resin is used as the material of the lenticular lens sheet 21.

The substrate 25 is attached inside the outer frame 22 in a position facing the flat surface 21A of the lenticular lens sheet 21. The LED chips 24 are disposed on the substrate 25 in plural number as a light source of the decorative cover 10. The LED chips 24 are arranged parallel to the longitudinal direction of each cylindrical lens 26 (Y direction) on the flat surface 21A side of the lenticular lens sheet 21. The LED chips 24 are controlled to emit light by a drive unit 27 that is disposed on the substrate 25. The drive unit 27 is connected with the control unit 15 of the smartphone 11 through the connection points 17 and 23. The drive unit 27 changes a light emission state of each LED chip 24 in accordance with an operating state of the smartphone 11 operated by the control unit 15. The light emission state includes timings of light emission and light non-emission, a light emission pattern, and the like.

A red LED, a green LED, a blue LED, a white LED, or the like is used as each LED chip 24. The plurality of LED chips 24 disposed on the substrate 25 may exhibit the same color or may exhibit a combination of a plurality of colors.

For example, dedicated application software is installed on the smartphone 11 in the case of attaching the decorative cover 10 to the smartphone 11. The smartphone 11 outputs a control signal from the connection point 17 in accordance with the operating state thereof by executing the application software.

The operating state of the smartphone 11 includes a calling state of making a call to another telephone, a Net browsing state of displaying a web page or the like on the display and input unit 12 by connecting to the Internet, a mail sending and receiving state of sending and receiving mails, and the like. In each state, the control unit 15 outputs a light emission control signal that causes the LED chips 24 to emit light. The light emission control signal controls the light emission pattern that causes each of the plurality of LED chips 24 to emit light. The light emission pattern is preferably different for each operating state.

The drive unit 27 receives the light emission control signal from the smartphone 11 through the connection points 17 and 23. The drive unit 27 places each LED chip 24 into the light emission state or a light non-emission state based on the received light emission control signal.

Figure 5:
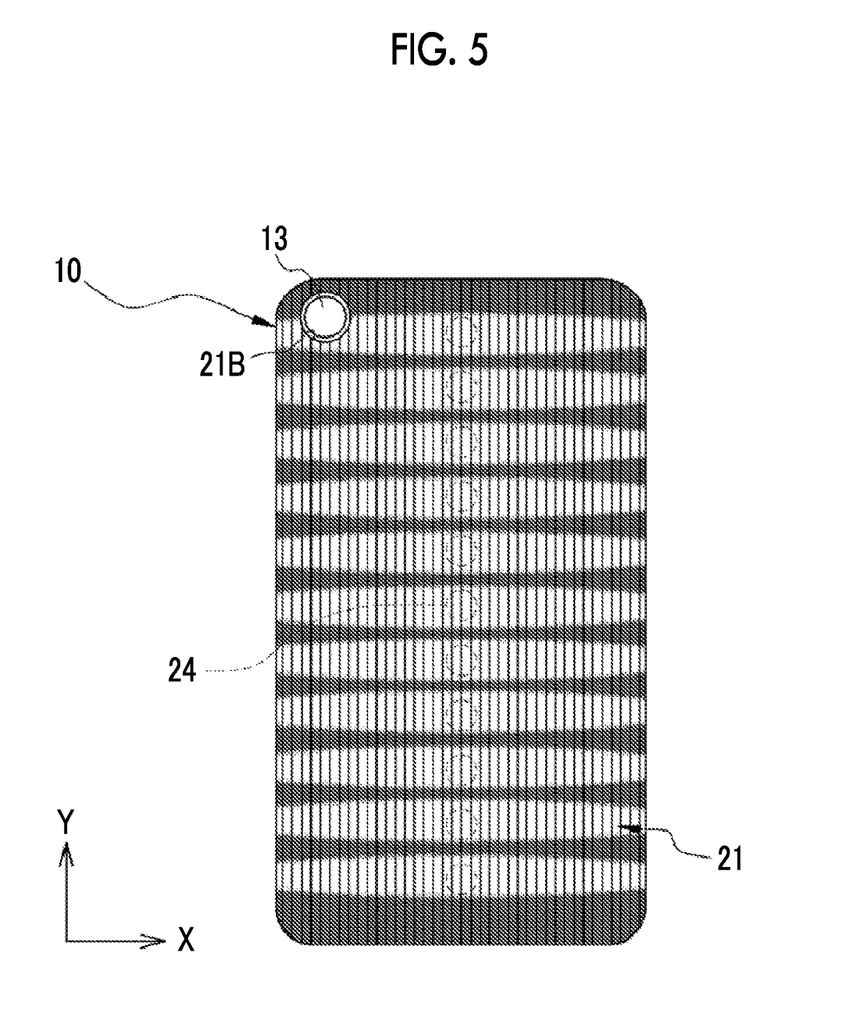
FIG. 5 is a rear view illustrating a light emission state of the decorative cover.

FIG. 5 illustrates a state where all of the LED chips 24 emit light. Light that is emitted from each LED chip 24 is diffused in the direction of arrangement of the cylindrical lenses 26 (X direction) to have a line shape when passing through the lenticular lens sheet 21. The light having a line shape is generated for each LED chip 24 disposed parallel to the longitudinal direction of each cylindrical lens 26 (Y direction) in the decorative cover 10. Thus, highly decorative illumination light having fringes is achieved across approximately the entire surface of the lenticular lens sheet 21.

Each LED chip 24 is placed into the light emission state or the light non-emission state based on the light emission control signal in accordance with the operating state of the smartphone 11. Thus, a user can recognize the operating state of the smartphone 11 by the light emission pattern of the illumination light.

As described heretofore, the LED chips 24, the substrate 25, and the like in the decorative cover 10 of the present invention are covered with the lenticular lens sheet 21 and the outer frame 22 and do not cause a finger or the like to be caught. Thus, the smartphone 11 can be safely manipulated. Furthermore, in a case where the smartphone 11 is operated, each LED chip 24 in the decorative cover 10 is placed into the light emission state or the light non-emission state in accordance with the operating state of the smartphone 11. Light having a line shape is emitted through the lenticular lens sheet 21. Thus, highly decorative illumination light is achieved, and the decorative quality of the smartphone 11 is improved.

While the embodiment changes the light emission pattern of each LED chip 24 by the light emission control signal in accordance with the operating state of the smartphone 11, the light emission pattern may be changed in accordance with information included in the smartphone 11. For example, the light emission pattern may be changed in accordance with call or mail reception information (indicates whether or not a call or a mail is received), remaining battery capacity information, current time, meteorological information such as weather and temperature, and the like.

Second Embodiment

While one lenticular lens sheet 21 is disposed in the decorative cover 10 in the first embodiment, the present invention is not limited thereto. It is also preferable to stack a plurality of lenticular lens sheets.

Figure 6:
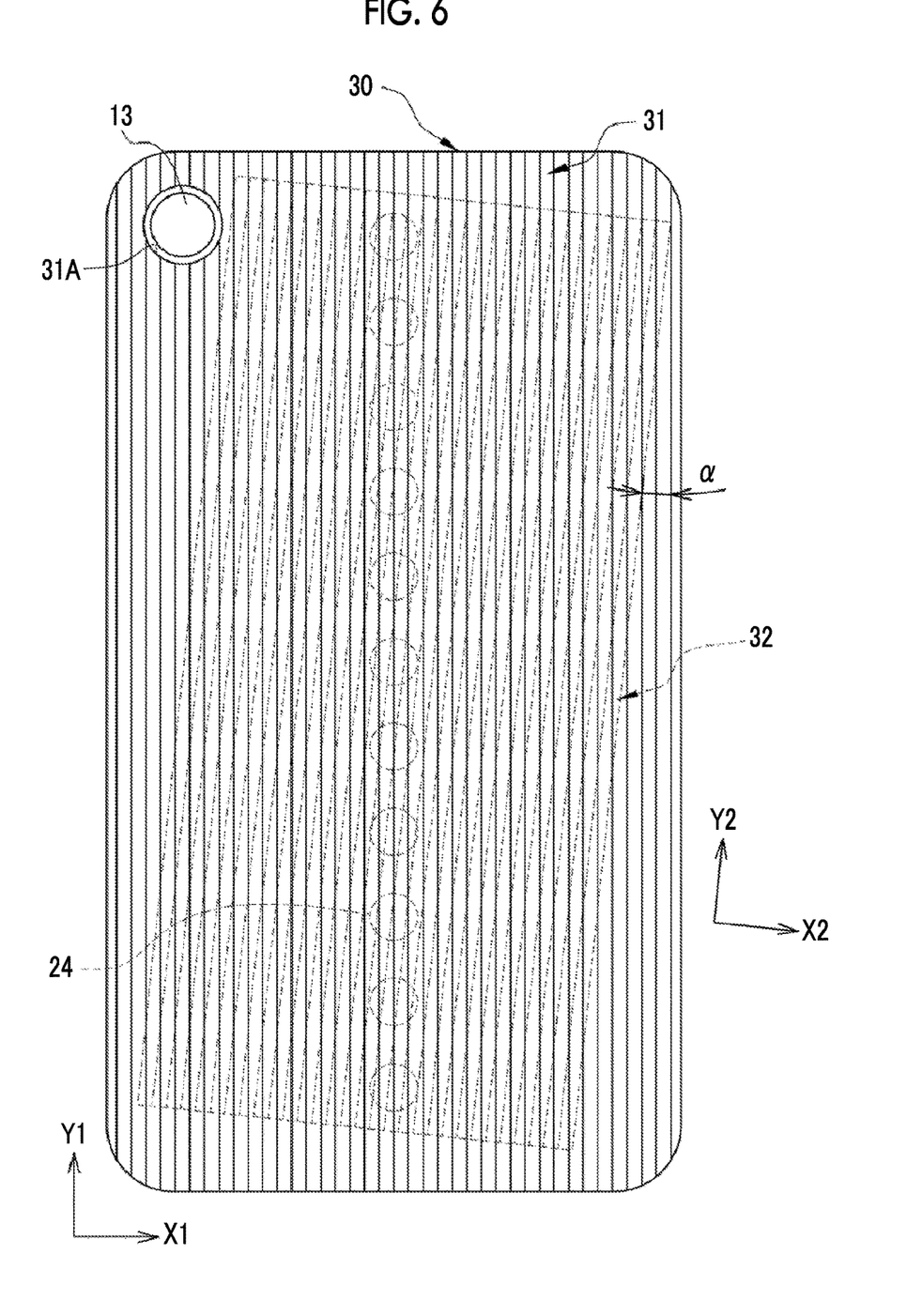
FIG. 6 is a rear view of a decorative cover of a second embodiment in which a plurality of lenticular lens sheets is stacked.
Figure 7:
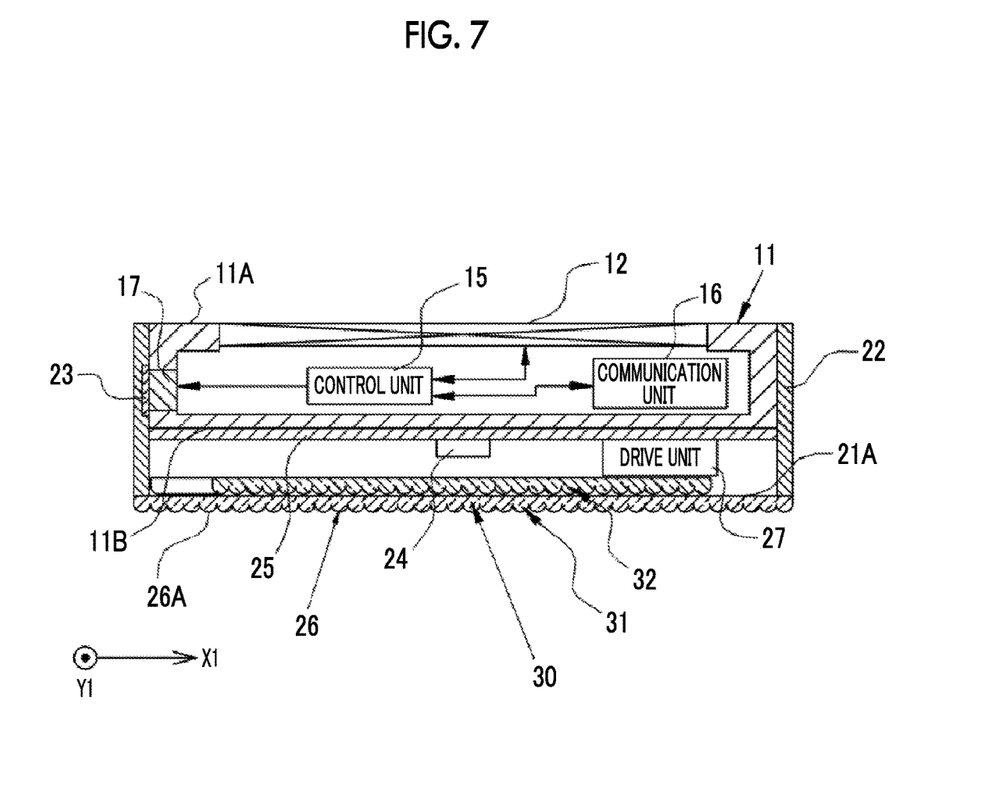
FIG. 7 is a sectional view of a main portion including the decorative cover of the second embodiment and the smartphone.

In FIG. 6 and FIG. 7, a decorative cover 30 of a second embodiment has a first lenticular lens sheet 31 and a second lenticular lens sheet 32. The first lenticular lens sheet 31 and the second lenticular lens sheet 32 are stacked. The first lenticular lens sheet 31 is integrated with the outer frame 22 in the same manner as the lenticular lens sheet 21 of the first embodiment. The first lenticular lens sheet 31 covers the rear surface 11B of the smartphone 11 in a case where the outer frame 22 is fitted onto the outer periphery of the smartphone 11. An opening portion 31A that exposes the camera module 13 is formed on the first lenticular lens sheet 31.

The second lenticular lens sheet 32 has the same configuration as the first lenticular lens sheet 31 except for being smaller than the first lenticular lens sheet 31. The second lenticular lens sheet 32 is attached between the first lenticular lens sheet 31 and the substrate 25.

The first lenticular lens sheet 31 and the second lenticular lens sheet 32 are bonded by a method of adhesion, gluing, or the like. A material having light transmittance is used as a bond (an adhesive or a gluing agent) that bonds the first lenticular lens sheet 31 and the second lenticular lens sheet 32, so that illumination light can be observed through the first lenticular lens sheet 31 and the second lenticular lens sheet 32.

The first lenticular lens sheet 31 and the second lenticular lens sheet 32 are not disposed parallel to each other. That is, the longitudinal direction of each cylindrical lens 26 of the second lenticular lens sheet 32 (Y2 direction) has an inclination c with respect to the longitudinal direction of each cylindrical lens 26 of the first lenticular lens sheet 31 (Y1 direction). The second lenticular lens sheet 32 is inclined with respect to the first lenticular lens sheet 31. Accordingly, illumination light emitted from the LED chips 24 is diffused in different directions when passing through the first lenticular lens sheet 31 and when passing through the second lenticular lens sheet 32 respectively.

Figure 8:
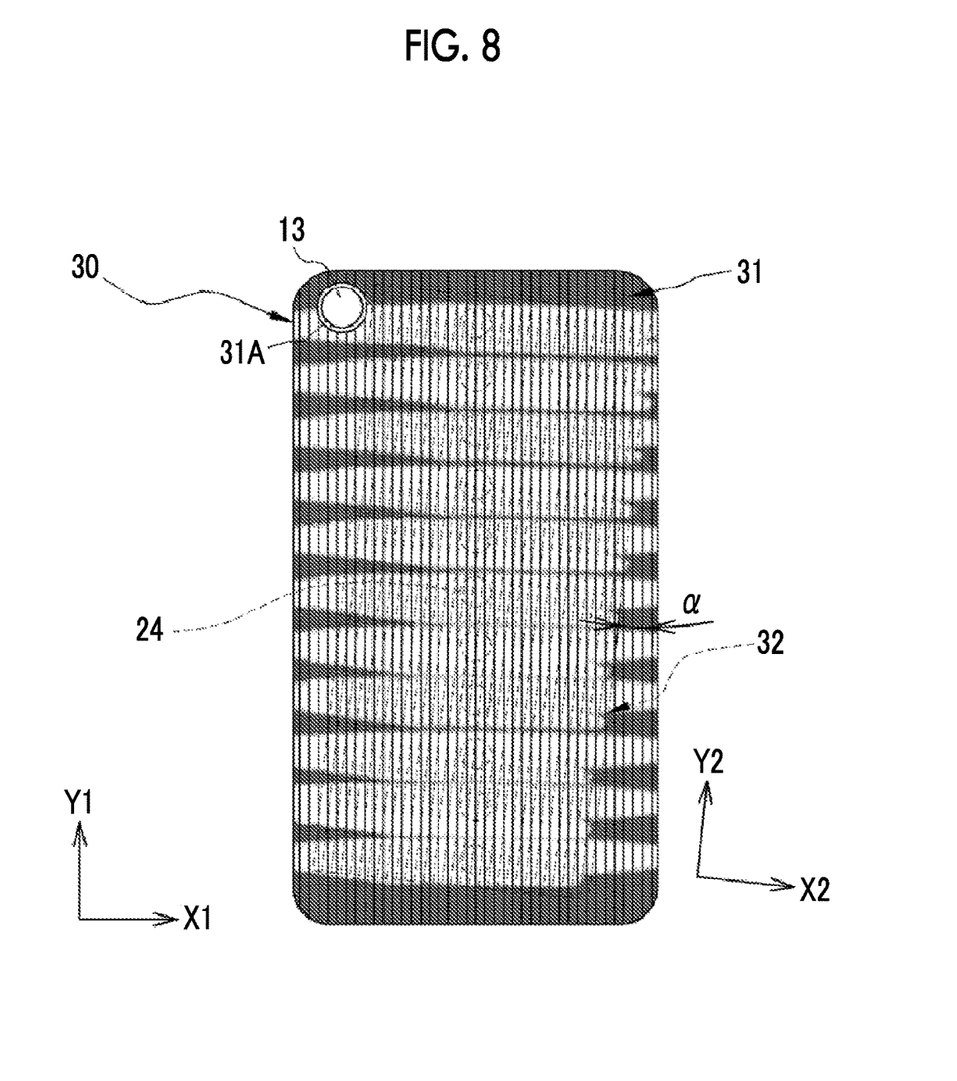
FIG. 8 is a rear view illustrating a light emission state of the decorative cover of the second embodiment.

As illustrated in FIG. 8, light emitted from each LED chip 24 is diffused in each of the direction of arrangement of the cylindrical lenses 26 of the first lenticular lens sheet 31 (X1 direction) and the direction of arrangement of the cylindrical lenses 26 of the second lenticular lens sheet 32 (X2 direction), thereby forming light having a shape of intersecting lines. That is, moire occurs in the illumination light in accordance with the inclination α, and a special visual effect is achieved. Accordingly, the present embodiment achieves more highly decorative illumination light.

While the second lenticular lens sheet 32 is fixed by being bonded to the first lenticular lens sheet 31 in the second embodiment, the present invention is not limited thereto. The second lenticular lens sheet 32 may be rotatably disposed, and a rotation mechanism (not illustrated) that changes the inclination of the longitudinal direction of each cylindrical lens 26 of the second lenticular lens sheet 32 by rotating the second lenticular lens sheet 32 with respect to the first lenticular lens sheet 31 may be disposed.

In this case, the drive unit 27 may operate the rotation mechanism in accordance with the control signal of the smartphone 11 and may rotate the second lenticular lens sheet 32 in accordance with the operating state of the smartphone 11 or the information included in the smartphone 11.

Third Embodiment

While the lenticular lens sheet is transparent in the first and second embodiments, an image may be formed on the flat surface side of the lenticular lens sheet.

Figure 9:
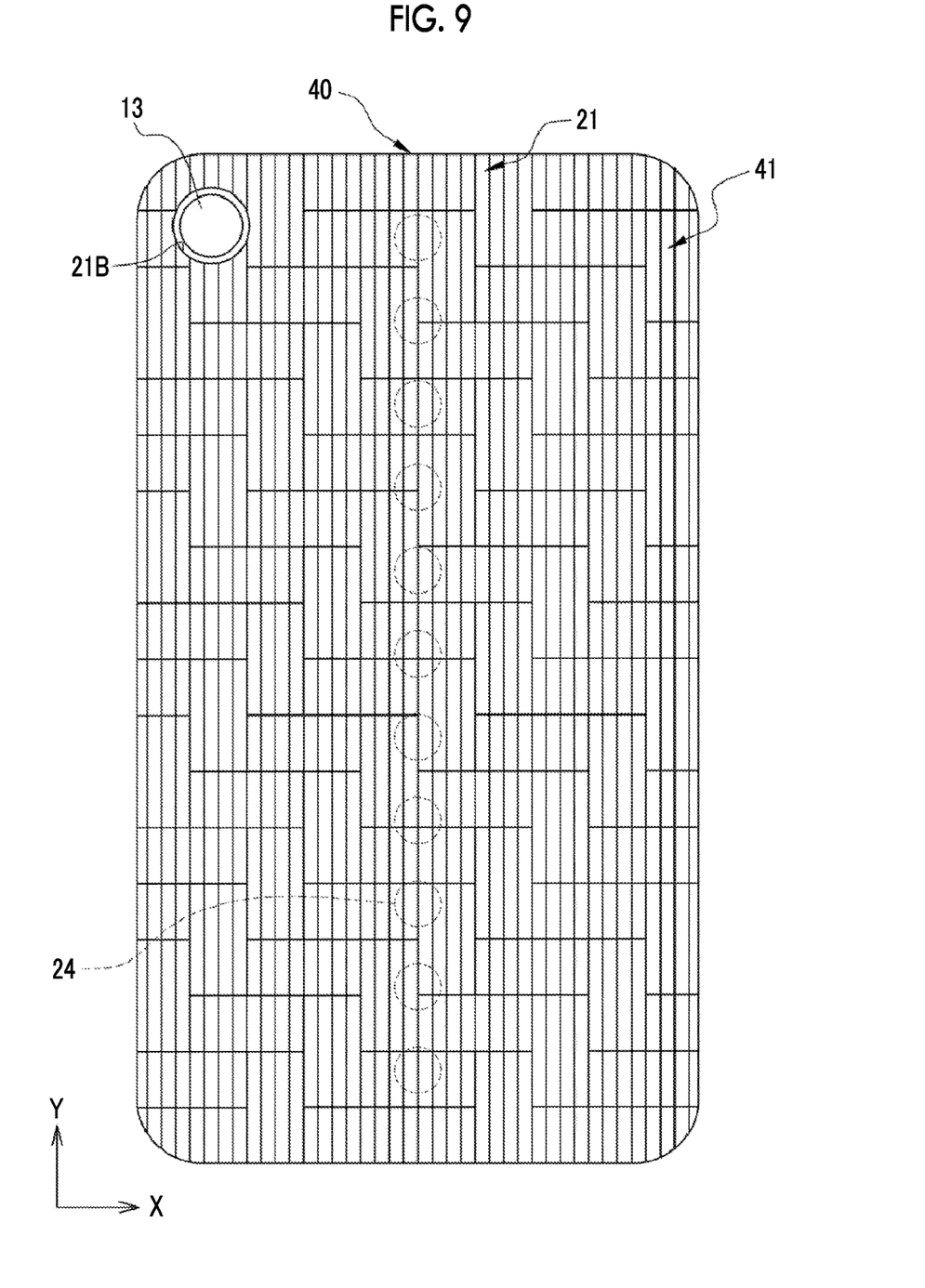
FIG. 9 is a rear view of a decorative cover of a third embodiment in which an image formation layer is integrated with a lenticular lens sheet.
Figure 10:
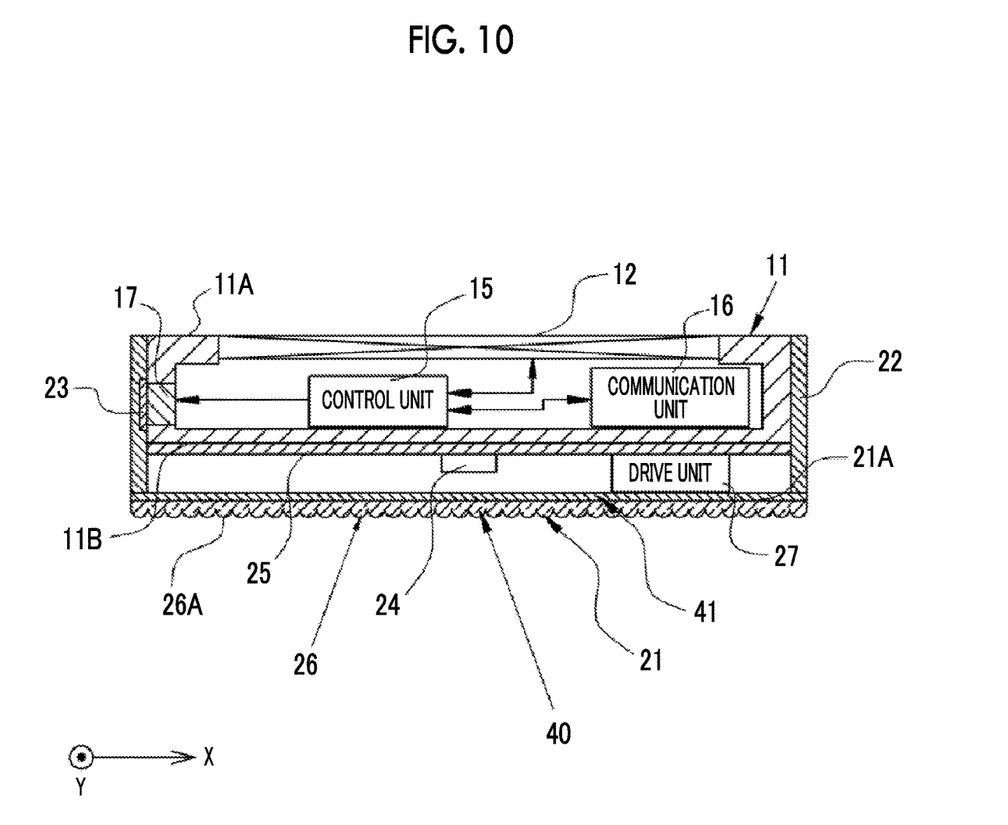
FIG. 10 is a sectional view of a main portion including the decorative cover of the third embodiment and the smartphone.

An image formation layer 41 is integrated with the lenticular lens sheet 21 in a decorative cover 40 of a third embodiment illustrated in FIG. 9 and FIG. 10. The decorative cover 40 has the same configuration as the decorative cover 10 of the first embodiment except for having the image formation layer 41.

The image formation layer 41 is disposed on the flat surface 21A side of the lenticular lens sheet 21. The image formation layer 41 is formed by directly printing or transferring an image to the flat surface side 21A. In this case, the material of the image formation layer 41 may be any light-transmitting material that can be closely attached to the flat surface 21A of the lenticular lens sheet 21. Known paint or the like is used as the material of the image formation layer 41.

A pattern is formed on the image formation layer 41. A twill pattern that is generated in the case of twilling carbon fiber is formed as the pattern on the image formation layer 41 in the present embodiment. When the LED chips 24 emit light, light having a line shape is emitted through the lenticular lens sheet 21, and the pattern formed on the image formation layer 41 appears in the illumination light. Accordingly, the present embodiment achieves more highly decorative illumination light.

While the image formation layer 41 is directly formed on the flat surface 21A of the lenticular lens sheet 21 in the present embodiment, the image formation layer 41 may be formed on an image formation medium (not illustrated) that is a transparent resin sheet, and then, the image formation medium may be bonded to the lenticular lens sheet 21. In this case, a transparent material is used as a bond (an adhesive or a gluing agent) that bonds the lenticular lens sheet 21 and the image formation medium, so that the image formation layer 41 can be observed through the lenticular lens sheet 21.

Fourth Embodiment

Figure 11:
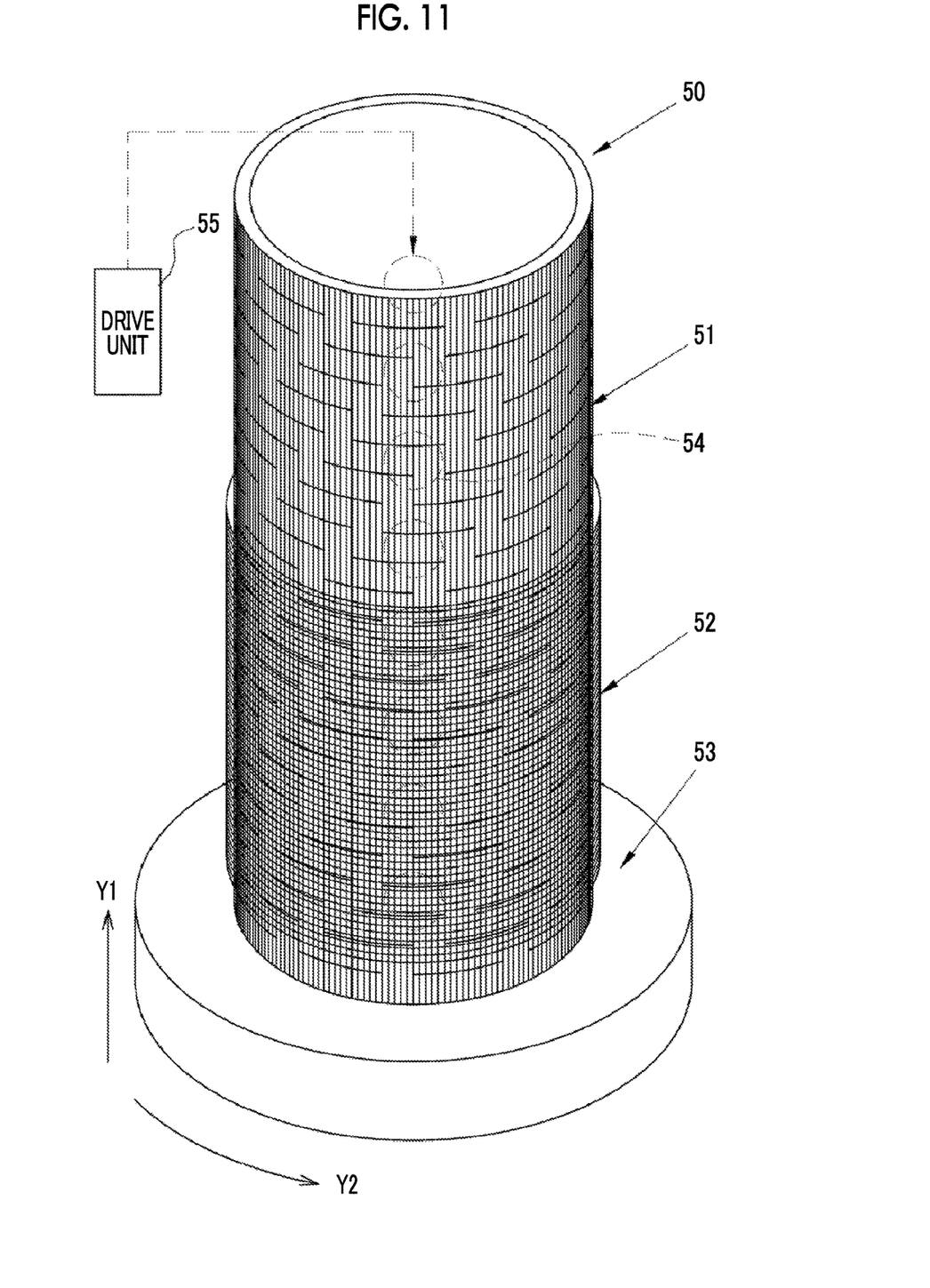
FIG. 11 is a perspective view illustrating an example in which the present invention is applied to an illumination device.

Next, FIG. 11 illustrates an example in which the decorative device of the present invention is applied to an illumination device 50. The illumination device 50 includes a first lenticular lens sheet 51, a second lenticular lens sheet 52, a pedestal 53, a plurality of light sources 54, and a drive unit 55 that changes a light emission state of each light source 54. The image formation layer 41 in the third embodiment is disposed on the first lenticular lens sheet 51 of the lenticular lens sheets 51 and 52.

The illumination device 50, for example, is attached to a desktop computer as an operating device. The drive unit 55 is electrically connected with a control unit of the computer. The drive unit 55 changes the light emission state of each light source 54 in accordance with the operating state of the computer. The light emission state includes timings of light emission and light non-emission, a light emission pattern, and the like.

The first lenticular lens sheet 51 is curved in a cylindrical shape with the convex shape 26A of each cylindrical lens 26 of the first lenticular lens sheet 51 disposed on the outer circumferential surface of the first lenticular lens sheet 51. The direction of the curve is orthogonal with respect to the longitudinal direction of each cylindrical lens 26 of the first lenticular lens sheet 51 (Y1 direction). The first lenticular lens sheet 51 is supported by the pedestal 53.

The second lenticular lens sheet 52 is curved in a cylindrical shape such that the inner circumferential surface of the second lenticular lens sheet 52 surrounds the outer circumferential surface of the first lenticular lens sheet 51. The longitudinal direction of each cylindrical lens 26 of the first lenticular lens sheet 51 is orthogonal with respect to the longitudinal direction of each cylindrical lens 26 of the second lenticular lens sheet 52. The longitudinal direction of each cylindrical lens 26 of the second lenticular lens sheet 52 (Y2 direction) is orthogonal with respect to the longitudinal direction of each cylindrical lens 26 of the first lenticular lens sheet 51 (Y1 direction).

Each light source 54 consists of, for example, an LED and is supported by a pillar not illustrated. Each light source 54 is disposed parallel to the longitudinal direction of each cylindrical lens 26 of the first lenticular lens sheet 51 at predetermined intervals in a cylindrical internal space formed by the first lenticular lens sheet 51.

A red LED, a green LED, a blue LED, a white LED, or the like is used as each light source 54. The plurality of light sources 54 disposed in the illumination device 50 may exhibit the same color or may exhibit a combination of a plurality of colors.

The second lenticular lens sheet 52 is slidable with respect to the first lenticular lens sheet 51. Light that is emitted from each light source 54 is diffused in the direction of arrangement of the cylindrical lenses 26 of the first lenticular lens sheet 51 (Y2 direction) to have a ring shape when passing through the first lenticular lens sheet 51. The light emitted from each light source 54 is diffused in the direction of arrangement of the cylindrical lenses 26 of the second lenticular lens sheet 52 (Y1 direction) to have a line shape when passing through the second lenticular lens sheet 52.

Accordingly, the light emitted from each light source 54 is diffused in a direction orthogonal with respect to the longitudinal direction of each cylindrical lens 26 when passing through the first lenticular lens sheet 51 and when passing through the second lenticular lens sheet 52. Thus, highly decorative illumination light is achieved.

The second lenticular lens sheet 52 is slidable with respect to the first lenticular lens sheet 51. Thus, the user can change the direction of diffusion of the light by manually sliding the second lenticular lens sheet 52.

While the second lenticular lens sheet 52 is manually slidable with respect to the first lenticular lens sheet 51 in the example illustrated in FIG. 11, the present invention is not limited thereto. A movement mechanism (not illustrated) that electrically moves the second lenticular lens sheet 52 may be disposed. In this case, the drive unit 55 preferably operates the movement mechanism in accordance with a control signal of the computer to slide the second lenticular lens sheet 52 in accordance with the operating state of the computer.

Fifth Embodiment

Figure 12:
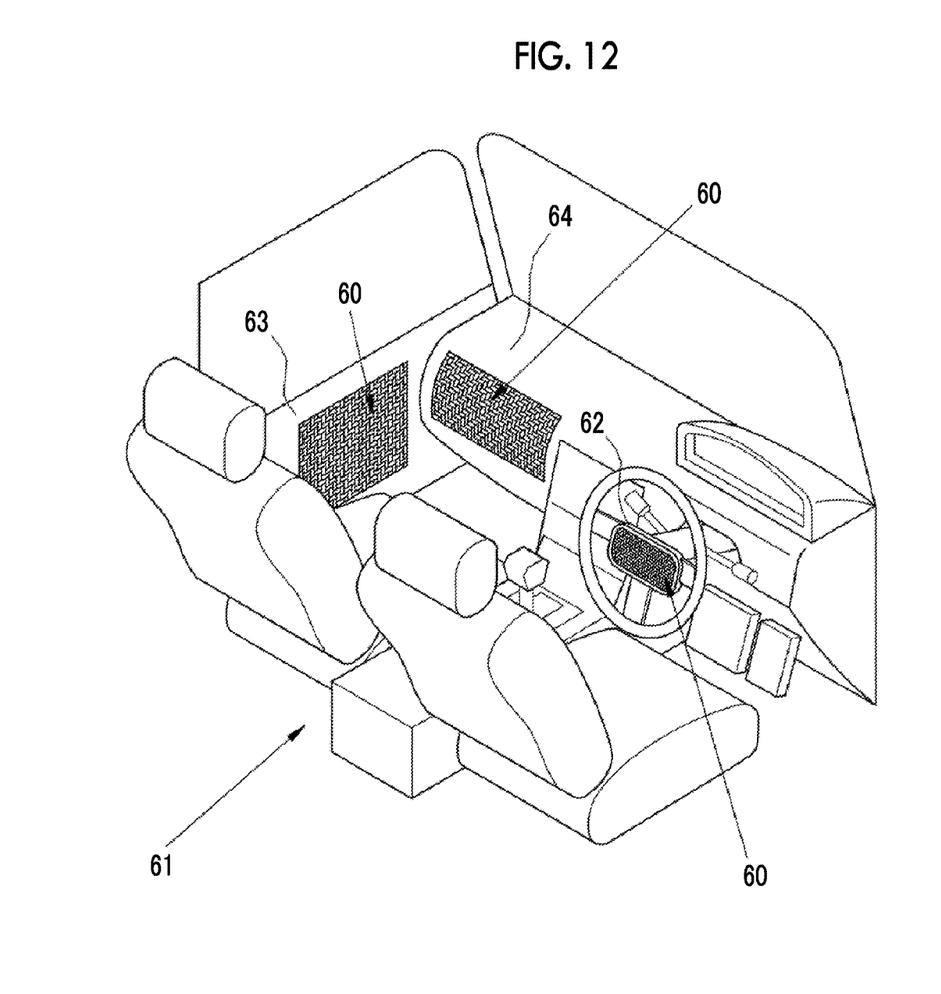
FIG. 12 is a perspective view illustrating an example in which the present invention is applied to an interior component of an automobile.

FIG. 12 illustrates an example in which a decorative device 60 of the present invention is applied to an interior component of an automobile 61 as an operating device. The decorative device 60 is attached by being embedded in a part of the interior component. The decorative device 60 includes the lenticular lens sheet 21, the plurality of LED chips 24, and the substrate 25 of the decorative cover 10 of the first embodiment. The image formation layer 41 of the third embodiment is integrated with the lenticular lens sheet 21.

The decorative device 60 is attached to, for example, a steering wheel 62, a door panel 63, and a dashboard 64 of the automobile 61. The decorative device 60 has flexibility and thus, is attached in a curved state in accordance with a curved surface of a part to which the decorative device 60 is attached.

The drive unit 27 disposed on the substrate 25 is electrically connected to a control unit of the automobile 61 through wiring not illustrated. In a case where, for example, an engine is started, the drive unit 27 outputs a light emission control signal that causes the LED chips 24 to emit light.

The drive unit 27 changes a light emission state of each LED chip 24 based on the light emission control signal in a case where the light emission control signal is sent from the control unit of the automobile 61. The light emission state includes timings of light emission and light non-emission, a light emission pattern, and the like.

While the light emission state of each LED chip 24 is changed by the light emission control signal sent from the control unit of the automobile 61 in the fifth embodiment, the timings of light emission and light non-emission, the light emission pattern, and the like may be set by, for example, a car navigation device that is attached to the automobile 61, and the light emission control signal may be sent to the drive unit 27 based on the setting. Alternatively, the light emission pattern and the like may be set from a communication terminal such as a smartphone or a tablet computer. The light emission pattern that is set in the drive unit 27 from the car navigation device or the communication terminal may be changed in accordance with, for example, current time, meteorological information such as weather and temperature, and a music played on a car stereo of the automobile 61.

While each of the embodiments uses an LED as a light source, a light source other than an LED may be used. The light source may have variable color, and the color of the light source may be changed based on the light emission control signal.

While the operating device to which the decorative device of the present invention is applied is exemplified by a smartphone, an automobile, and an illumination device in the embodiments, the present invention is not limited thereto. The decorative device of the present invention can be applied to operating devices such as a computer, an audio device, and a camera.

EXPLANATION OF REFERENCES

10, 30, 40: decorative cover (decorative device)
11: smartphone (operating device)
11A: front surface
11B: rear surface
12: display and input unit
13: camera module
14: power source switch
15: control unit
16: communication unit
17, 23: connection point
21: lenticular lens sheet
21A: flat surface 22: outer frame
22a: cutout
24: LED chip
25: substrate
26: cylindrical lens
26A: convex shape
27: drive unit
31, 51: first lenticular lens sheet
31A: opening portion
32, 52: second lenticular lens sheet
41: image formation layer
50: illumination device (decorative device)
53: pedestal
54: light source
55: drive unit
60: decorative device
61: automobile (operating device)
62: steering wheel
63: door panel
64: dashboard

What is claimed is:

1. A decorative device that decorates an operating device, the decorative device comprising:
   a lenticular lens sheet in which a plurality of cylindrical lenses having a convex shape is arranged with a flat surface formed on an opposite side from the convex shape;
   a plurality of light sources that is disposed on the flat surface side, the plurality of light sources being arranged parallel to a longitudinal direction of each cylindrical lens, approximately from one side to the other side of the decorative device; and
   a drive unit that changes a light emission state of the light source in accordance with an operating state of the operating device or information included in the operating device,
   wherein the lenticular lens sheet is provided in plural number, and the plurality of lenticular lens sheets is stacked, and
   wherein one lenticular lens sheet is inclined with respect to another lenticular lens sheet.

2. The decorative device according to claim 1,
   wherein the drive unit changes a light emission pattern of the light source in accordance with the operating state of the operating device or the information included in the operating device.

3. A decorative device that decorates an operating device, the decorative device comprising:
   a lenticular lens sheet in which a plurality of cylindrical lenses having a convex shape is arranged with a flat surface formed on an opposite side from the convex shape;
   a plurality of light sources that is disposed on the flat surface side, the plurality of light sources being arranged parallel to a longitudinal direction of each cylindrical lens, approximately from one side to the other side of the decorative device; and
   a drive unit that changes a light emission state of the light source in accordance with an operating state of the operating device or information included in the operating device,
   wherein the lenticular lens sheet is provided in plural number, and the plurality of lenticular lens sheets is stacked, and
   wherein one lenticular lens sheet is slidably disposed with respect to another lenticular lens sheet.

4. A decorative device that decorates an operating device, the decorative device comprising:
   a lenticular lens sheet in which a plurality of cylindrical lenses having a convex shape is arranged with a flat surface formed on an opposite side from the convex shape;
   a plurality of light sources that is disposed on the flat surface side, the plurality of light sources being arranged parallel to a longitudinal direction of each cylindrical lens, approximately from one side to the other side of the decorative device; and
   a drive unit that changes a light emission state of the light source in accordance with an operating state of the operating device or information included in the operating device,
   wherein an image formation layer on which a pattern is formed is disposed on the flat surface side of one lenticular lens sheet.

* * * * *